United States Patent [19]

Jada

[11] Patent Number: 4,636,440

[45] Date of Patent: Jan. 13, 1987

[54] NOVEL PROCESS FOR COATING SUBSTRATES WITH GLASS-LIKE FILMS AND COATED SUBSTRATES

[75] Inventor: Sivananda S. Jada, Englewood, Colo.

[73] Assignee: Manville Corporation, Denver, Colo.

[21] Appl. No.: 791,845

[22] Filed: Oct. 28, 1985

[51] Int. Cl.$^4$ ................................................ B32B 9/04
[52] U.S. Cl. .................................. 428/446; 427/376.2; 427/387; 427/389.8; 427/402; 428/392; 428/448
[58] Field of Search ............... 427/376.2, 376.4, 376.5, 427/333, 341, 343, 340, 344, 402, 419.2, 419.6, 397.7, 387, 389.8; 428/446, 447, 448, 392, 702, 290, 268, 286

[56] References Cited

U.S. PATENT DOCUMENTS

| | | | |
|---|---|---|---|
| 3,870,545 | 3/1975 | Tabacek et al. | 427/419.2 |
| 4,045,599 | 8/1977 | Remaley et al. | 427/419.2 |
| 4,150,191 | 4/1979 | Karki | 427/344 |
| 4,288,299 | 9/1981 | Carter | 427/419.2 |
| 4,297,246 | 10/1981 | Cairns et al. | 427/419.2 |
| 4,476,156 | 10/1984 | Brinker et al. | 427/376.2 |

*Primary Examiner*—Sadie L. Childs
*Attorney, Agent, or Firm*—John D. Lister; Cornelius P. Quinn; Gregory A. Evearitt

[57] ABSTRACT

A sol-gel coated substrate is additionally coated with certain disclosed aqueous quaternary ammonium hydroxide and/or alkanol amine compounds. Through this procedure, the drying time achieved to effect a crack-free coated substrate is greatly reduced. Also disclosed are coated substrates prepared by the process of the present invention.

11 Claims, No Drawings

NOVEL PROCESS FOR COATING SUBSTRATES WITH GLASS-LIKE FILMS AND COATED SUBSTRATES

FIELD OF THE INVENTION

This invention relates to a novel process for coating various substrates with a glass-like film. It also relates to coated substrates prepared by the process of the present invention.

BACKGROUND OF THE INVENTION

Various substances have been developed in the past for use as coatings and films to be applied to metal, glass, and ceramic substrates by simple commercial processes such as spraying, dipping, or spinning. Typically, such substances developed for use as coating and films were organic polymer based coatings. While some organic polymer based materials formed some degree of commercial acceptance, many of them had very limited performances in hostile environments, i.e. high temperature, corrosive, or abrasive environments.

In recent years there has been a continuing interest in developing metal-based polymeric coatings, espcially glass-like coatings, as substitutes for organic-polymer based ones. Ideally, such a coating should be refractory, corrosion resistant, electrically insulating, flexible enough to be coated on a wire, and also be applicable at low temperatures compatible with the desired substrate.

Typically, these metal base coatings are made by the so-called sol-gel process. In this process, metal alkoxides of network forming cations, e.g., Si, Al, B, Ti, etc. are used as glass precursors. According to the typical process, the metal alkoxides, such as silcon alkoxide represented by the general formula $Si(OR)_4$ wherein R typically represents an alkyl radical, are dissolved first in an alcohol solvent and then partially hydrolyzed by adding water, usually in a stoichiometric molar excess amount. The partially hydrolyzed alkoxides are then polymerized to form a glass-like network linked by bridging oxygen atoms. Dilute solutions (2–5 equivalent wt % oxides) can be applied to various substrates by dipping, spinning, and drying operations. When applied to a substrate, the partially hydrolyzed glass-like polymers react chemically with the surface and thus cause complete wetting and subsequent adherence to the surface of the substrate. The microporous silica-like polymer film can then be converted to a dense like glass film by relatively low-tempeature heat treatment. In sol-gel applications, however, the formation of voids and cracks is the gel are inevitable due to the drying stresses generated by the evaporation of volatiles or low molecular weight intermediate compounds from the gel micropores.

In the past, efforts to reduce crack formation in the drying process of gels have been made by adding a drying control chemical additive (DCCA) such as formamide to the gel. However, this procedure is impractical because of the long drying time required, e.g. a minimum of 12 hours at a temperature of 60° C.

SUMMARY OF THE INVENTION

In accordance with the present invention, Applicant has discovered that by applying particular types of aqueous quaternary ammonium compounds and/or aqueous alkanol amines to the surface of a sol-gel coated substrate there is achieved a great reduction in the amount of drying time required to form a dense, crack-free sol-gel coated product.

DETAILED DESCRIPTION OF THE INVENTION

As explained herein earlier, a sol-gel solution is essentially an aqueous alcoholic solution containing a polymeric network of partially hydrolyzable metal alkoxide. Such a sol-gel solution can be prepared as described herein or by any other procedure known to those skilled in the art.

Suitable metal alkoxides for use in the sol-gel solution preferably include those having alkyl portions of 1-4 carbon atoms. Suitable metals in the metal alkoxides include a very wide group of metals, such as those of Groups II, III, and IV of the Periodic Table, as well as transition metals and other multivalent (e.g., +3, +4, +5, etc.) metals whose alkoxides form polymeric networks upon hydrolysis. Usually, the metal is one like boron, aluminum, titanium, silicon, zirconium, and other ceramic types of metals.

Representative but non-limiting examples of suitable metal alkoxides include: tetramethoxysilane, tetraethyoxysilane, methyltrimethoxysilane, ethyltriethoxysilane, amyltriethyoxysilane, trimethoxyborane, triethoxyborane, tetraethoxytitanium, and tributoxyaluminum.

Suitable alcohols for use in the solution are lower alkanols, e.g., $C_{1-4}$ alkanols. Often, the alkyl portion of the alcohol will be the same as that of the alkyl portion of the alkoxide. Usually, ethanol or proponal is employed with any alkoxide. However, the precise identity of the alcohol is not critical. In general, as with the alkoxides, the higher the molecular weight of the alcohol, the slower will be the drying process, and the slower will be the polymerization process for the network. It is also possible to use in place of or in addition to the metal alkoxides, combination derivatives of alkoxides and alcohols, such as methoxyethanols, etc.

Optionally, the solution can further comprise system compatible metal salts such as salts of the alkali metals or alkaline earth metals or mercury, etc. with system compatible anions such as nitrates, acetates, etc. These salts are added again to tailor the properties of the resultant film to the desired end use. For example, addition of alkali metals to the blend will lower the glass transition temperature of the final oxide film as is well known. Thus, these salts have a flux-like effect. Care should be taken that the salt does not adversely influence the coherency of the finally obtained film. For example, the salt should not be one which will crystallize rapidly upon drying of the film. If rapid crystallization occurred, the film would have a tendency to become heterogeneous.

Normally, acid hydrolysis is used to prepare the partially hydrolyzed alkoxide solution. In this case, the pH is normally in the range of 1—2.5 and is provided by addition of an acid such as hydrochloric acid, nitric acid or equivalents thereof. Basic hydrolysis can also be employed, usually being conducted at a pH of 6–9. Suitable bases are ammonium hydroxide or other equivalent weak bases. More generally, suitable pH's are in the range of 1–9, intermediate pH's being achieved by addition of suitable buffer systems such as acetic acid-/acetate, etc., the precise choice being composition dependent as is fully conventional.

The precise composition of the solution will again be dependent upon the components involved and the final properties desired. Generally, the following relevant proportions will be used: 50–500 g total of metal alkoxide and metal salt, the latter component being provided in an amount of up to 50% of this total; 1,000–10,000 g of alcohol; 10–500 g of water; and sufficient amounts of acid or base to achieve the mentioned pH's, e.g., normally from a few drops up to about 1 ml of 1N HCL will suffice or up to 3 ml of NH$_4$OH.

Precise amounts can vary outside of these ranges as necessary. For example, the amount of metal salt employed will depend upon the nature of the final property desired. For low temperature melting situations, larger amounts of an alkali metal salt would be employed for example. For thin film applications, larger amounts of alcohol will be provided thereby increasing the dilution of the network structure. The amount of water will be conventionally varied in order to achieve the amount of hydrolysis which is desired. Typically, the solution applied to the substrate will have a viscosity in the range of $10^{-1}$ to 15 poise, or up to the gel point of the solution.

As stated herein earlier, conventional practice can be used to form the sol-gel solution. In general, the solution of the partially hydrolyzed alkoxide is formed. Conditions are selected to ensure that a precipitate is avoided and that the polymeric network remains in solution. Normally, the solution ingredients are added to the alcohol and then water is added. Typically, one mole of water is employed for each mole of alkoxide in order to achieve a condition where, even if the dehydration and condensation reactions go to completion, the system will remain soluble. The term "partial hydrolysis" is used simply because, in general, not all of the alkoxide groups will be hydrolyzed. Typically, the partial hydrolysis is carried out at a temperature of from room temperature to about 60°–80° C.

The degree of hydrolysis will be conventionally chosen, e.g., in consideration of the final application. For example, long chains (a higher degree of hydrolysis) will often be preferred when a linear alignment of polymers on the substrate is desired. The degree of hydrolysis is primarily controlled by choice of the amount of water in the solution. Generally, the lower the amount of water and the lower the pH, the lower will be the degree of hydrolysis; the more the amount of water and the higher the pH, the higher will be the degree of hydrolysis. However, degree of hydrolysis per se is not critical.

Illustratively, thickness control can be achieved, e.g., in a dipping operation, by control of any of the following parameters: (1) concentrating the sol-gel solution; (2) viscosity of the sol-gel solution; (3) dipping speed; (4) dipping angle; etc. In a spraying operation, the first two parameters as well as the spraying time can also be used to control thickness.

The amount of solution applied to the substrate in a given operation will be fully conventionally determined, e.g., by conventional consideration of the amount of ingredients in solution. The solution is normally applied at room temperature but, of course, can be used in any given application. Similarly, it is also possible to preheat the substrate and apply the solution thereto.

The solution application onto the substrate can be carried out under normal atmospheric conditions. However, when dictated by conventional considerations, these steps can be carried out in an inert, reducing, or oxidative atmosphere, or even in vacuo, if necessary.

The applied film or coating dries rapidly which is a significant advantage for commercial application.

The films and coatings made by the process of this invention can be applied to substrate surfaces where it is desired to render the same insulating, abrasion resistant, impervious, etc. The normal application is for protection of the underlying substrate. However, optical applications are also possible by suitable conventional control of the thickness of the layer.

There is essentially no limitations on the substrate surfaces themselves to which the films or coatings made by the process of the present invention can be applied. Metals, glasses, ceramics, semi-conductors, etc. can all be coated.

After the sol-gel coating has been applied to the substrate, the substrate is coated again with at least one aqueous compound selected from the group consisting of (a) an aqueous quaternary ammonium hydroxide of the general formula NR$_4$OH wherein each R independently represents H or a C$_1$ to C$_{10}$ alkyl group and (b) an aqueous alkanol amine of the general formula H$_2$NR$^1$OH wherein R$^1$ represents a C$_1$ to C$_{10}$ alkylene group.

Preferably R represents H or a C$_1$ to C$_6$ alkyl radical, most preferably H. R$^1$ will preferably be a C$_1$ to C$_6$ alkylene radical.

In the present invention, the term "aqueous compounds" includes aqueous compounds in either the liquid or vaporous state or a combination thereof.

The concentration of the aqueous quaternary ammonium compound employed should preferably be in the range of 1N to 12N and most preferably 6N.

The concentration of the aqueous alkanol amine compound employed should preferably be in the range of 0.5 to 2 times and preferably equal to, the molar concentration of the tetraethoxysilane used to form the original sol-gel solution.

This second coating can be applied to the sol-gel coated substrate in any suitable manner such as spraying. Whatever method of application is used, the second compound should be applied in a manner so as to thoroughly coat the surface of the sol-gel coated substrate.

Once the second coating is applied, the coated substrate can be allowed to dry, typically at room temperature. As will be seen by the examples given later herein, the present invention results in a greatly diminished drying time to achieve a crack-free coated substrate.

The dried mat can then be heated for a time and temperature sufficient to effect curing of the substrate.

The following examples further illustrate the present invention.

EXAMPLES

Example I

This example illustrates a conventional practice of preparing a sol-gel solution using formamide as a drying chemical control additive (DCCA) to prevent cracking of and to increase the drying rate of the sol-gel solution.

41.6 grams (0.2 moles) of tetraethoxysilane (TEOS) and 92 grams (2 moles) of anhydrous ethanol solvent were added to a beaker and mixed together. The pH of the resulting mixture was adjusted to about 2.0 by the addition of concentrated HCl. 7.2 grams (0.4 moles) of H$_2$O were then added to the beaker with the pH maintained continuously by the addition of concentrated HCl. The contents of the beaker were then mixed for about 15 minutes. Formamide (0.4 moles) was added and the reaction mixture was refluxed for about 6 hours. The solution was cooled to room temperature and applied to a 6"×6" fiber glass mat (B-20 made by Manville Service Corporation) weighing about 3.5 g. Excess solution was drained by applying a vacuum. The thus coated glass mat was then allowed to dry at room temperature. The total drying time for the coated mat was 48 hours. The dried mat was then heat-treated at 25° C. for one hour. The cured mat showed voids and failed a fire resistance test according to ASTM E 119-83.

Example II

This example illustrates another conventional practice for preparing a sol-gel solution using formamide as a DCCA.

A sol-gel solution was prepared as described in Example I except for the timing of the addition of formamide. 0.4 moles of formamide was added to the room temperature cooled sol-gel solution just before coating to the glass mat. The total drying time was 58 hours. The dried mat was then heat treated at 25° C. for one hour. The cured mat showed voids and failed fire resistance test ASTM E 119-83.

Example III

This example illustrates the inventive process for treating a sol-gel coated substrate.

A sol-gel solution was prepared by adding together 2 moles of acetic acid and 2 moles of anhydrous ethanol in a beaker along with 0.2 moles of concentrated HCl. They were mixed together at room temperature for about 24 hours. 1 mole of TEOS was then added with the reaction solution agitated for about 16 hours.

A 6"×6" fiber glass mat (B-20) weighing about 3.5 g was then dipped in the sol-gel solution prepared above. The glass mat was then put under a vacuum desiccator containing 6N aqueous $NH_4OH$ and allowed to dry at room temperature. The drying time was 5 to 6 hours. The dried mat was then cured at about 250° C. for one hour.

The final cured product had a dense coating with a white appearance. Additionally, the product passed the fire resistance test of ASTM E 119-83.

Example IV

The same procedure was carried out as in the preceeding Example III except without the aqueous $NH_4OH$ vapor treatment.

The drying time for the sol-gel coated mat was 3-4 days. The dried mat was then cured at about 100° C. for 1 hour and then at about 250° C. for 1½ hours.

The final product showed voids and failed to pass the ASTM E 119-83 fire resistance test.

Reasonable modifications and variations are possible from the foregoing disclosure without departing from either the spirit or scope of the present invention.

I claim:
1. An improved process for coating and drying a substrate with a glass-like film comprising in order the steps of:
    (a) applying to the substrate an aqueous alcoholic solution containing a polymeric network of partially hydrolyzed silicon alkoxides;
    (b) applying to the thus coated substrate an additional coating of at least one aqueous compound selected from the group consisting of: (i) a quaternary ammonium hydroxide of the general formula $NR_4OH$ wherein each R independently represents hydrogen or a $C_1$ to $C_{10}$ alkyl group and (ii) an alkanol amine of the general formula $H_2NR^1OH$ wherein $R^1$ represents a $C_1$-$C_{10}$ alkylene group, whereby the surface of the coated substrate resulting from 1(a) is uniformly coated with said aqueous compound; and
    (c) drying the resulting coated substrate of 1(b) at room temperature for a period of time not to exceed about 6 hours.
2. A process according to claim 1 wherein said aqueous quaternary ammonium hydroxide compound has a concentration in the range of 1N to 12N.
3. A process according to claim 2 wherein R in 1(b) represents hydrogen or a $C_1$-$C_6$ alkyl radical.
4. A process according to claim 3 wherein said quaternary ammonium hydroxide compound is 6N aqueous ammonium hydroxide.
5. A process according to claim 4 wherein said aqueous ammonium hydroxide compound is at least partially vaporized.
6. A process according to claim 1 wherein $R^1$ in 1(b) represents a $C_1$-$C_6$ alkylene radical.
7. A process according to claim 1 wherein the dried, coated substrate resulting from 1(c) is subsequently cured.
8. A process according to claim 1 wherein said substrate is glass fibers.
9. A dried, coated substrate prepared by the process of claim 1 and having a fire resistance meeting the requirements of ASTM E 119-83.
10. A dried, coated substrate prepared by the process of claim 4 and having a fire resistance meeting the requirements of ASTM E 119-83.
11. A process according to claim 1 wherein said silicon alkoxide is tetraethyoxysilane.

* * * * *